United States Patent
Gokan et al.

(10) Patent No.: US 6,942,017 B2
(45) Date of Patent: Sep. 13, 2005

(54) INTERCOOLER

(75) Inventors: Yoshitsugu Gokan, Wako (JP); Fujio Umebayashi, Wako (JP); Kazuhiko Tomoda, Wako (JP); Kenji Okubo, Wako (JP); Kouichi Takeshita, Konan (JP); Kazuhiro Yamashita, Konan (JP); Yoshihiro Sekiya, Konan (JP)

(73) Assignees: Honda Giken Kogyo Kabushikikaisha, Tokyo (JP); Zexel Valeo Climate Control Corporation, Saitama (JP)

(*) Notice: Subject to any disclaimer, the term of this patent is extended or adjusted under 35 U.S.C. 154(b) by 49 days.

(21) Appl. No.: 10/118,230

(22) Filed: Apr. 9, 2002

(65) Prior Publication Data

US 2002/0144801 A1 Oct. 10, 2002

(30) Foreign Application Priority Data

Apr. 10, 2001 (JP) ........................ 2001-111243

(51) Int. Cl.[7] ................ F01P 1/00; F01P 3/00
(52) U.S. Cl. .................. 165/51; 165/160; 123/563
(58) Field of Search .................. 165/51, 160; 123/563; 417/243; 60/599

(56) References Cited

U.S. PATENT DOCUMENTS

| | | | |
|---|---|---|---|
| 4,415,024 A | * 11/1983 | Baker | 165/160 |
| 4,539,815 A | * 9/1985 | Garcea | 123/563 |
| 4,565,177 A | * 1/1986 | Roettgen et al. | 165/51 |
| 4,785,788 A | * 11/1988 | Targa Pascual | 165/141 |
| 5,566,748 A | * 10/1996 | Christensen | 165/41 |
| 5,894,649 A | * 4/1999 | Lambert et al. | 29/890.052 |
| 6,634,420 B2 | * 10/2003 | Gokan et al. | 165/51 |

FOREIGN PATENT DOCUMENTS

DE 197 24 728 A1 * 2/1999

* cited by examiner

*Primary Examiner*—Ljiljana Ciric
(74) *Attorney, Agent, or Firm*—Wenderoth, Lind & Ponack, L.L.P.

(57) ABSTRACT

An intercooler has a case through which supercharging air passes, and a heat exchanger 4 mounted inside the case which allows heat exchange between the supercharging air and a cooling fluid. A frame body 15 is provided at the circumferential edges of air passage portions of the heat exchanger 4 on a supercharging air intake side and a supercharging air outlet side to reduce the gap between the heat exchanger and the inner wall of the case. The heat exchanger 4 has a pair of tanks 43 and 44, tubes communicating between the tanks, and a plurality of fins 46 set along the tubes, and assumes a structure that allows the supercharging air to pass through the heat exchanger a plurality of times by sequentially passing through blocks formed by dividing a heat exchanging unit 4A into a plurality of blocks with partitioning plates 15d.

12 Claims, 10 Drawing Sheets

INTERCOOLER

BACKGROUND OF THE INVENTION

The present invention relates to an intercooler mounted in a small planing, boat such as a motorboat or a recreational watercraft, which is provided on the upstream side of the engine air intake port and is employed to cool supercharging air.

While 2-cycle engines have been commonly used as drive engines in small planing boats in the prior art, we are seeing more 4-cycle engines which are quieter and more environmentally friendly mounted in small planing boats in recent years. In such a small planing boat, a supercharger must be installed in order to improve the combustion rate in the engine. When such a supercharger is employed, the temperature of the supercharging air rises to 120° C.~130° C. and, thus, an intercooler must be provided to improve the engine output by cooling the supercharging air and thus increasing the air density.

It is mandated to provide a flame arrester in small planing boats in order to ensure that any backfire (the term "backfire" is hereafter used to refer to a flame propagating toward the air-intake side) does not blow out into the engine compartment, and Japanese Unexamined Patent Publication No. H 9-301271 and Japanese Unexamined Patent Publication No. H 10-258794 each disclose a structure having a flame arrester provided on the upstream side of a carburetor installed in the air intake path communicating with an air intake port of the engine.

However, as the engine is often mounted under a passenger seat in a small planing boat, even more rigorous measures must be taken to prevent any backfire from blowing out into the engine compartment. While such measures for preventing a backfire from blowing out into the engine compartment with a high degree of reliability may be achieved by providing a larger arrester device and thus improving the caloric capacity, the installation of a large arrester device in a small planing boat conflicts with its other essential requirements such as space saving and weight minimization.

SUMMARY OF THE INVENTION

Accordingly, an object of the present invention is to provide an intercooler that does not necessitate installation of a separate arrester device with a flame arrester function incorporated in the intercooler mounted to cool supercharging air. Thus, the intercooler achieves space savings and weight minimization.

In order to achieve the object described above, the intercooler according to the present invention has a case through which supercharging air passes and a heat exchanger provided inside the case so as to allow the supercharging air to pass through, and the heat exchanger allows for heat exchange between the supercharging air and a cooling fluid. A frame body which reduces the gap created between the heat exchanger and the inner wall of the case is mounted at the circumferential edges of the air passage portions both on the intake side and the outlet side where the supercharging air is taken in/let out at the heat exchanger.

Thus, since the frame body mounted at the heat exchanger reduces the gap between the heat exchanger and the inner wall of the case both on the supercharging air intake side and the supercharging air outlet side of the heat exchanger, the supercharging air is allowed to pass through the heat exchanger for efficient cooling with a high degree of reliability. At the same time, any backfire that would enter through a gap between the heat exchanger and the case is eliminated, thereby achieving the object described above.

This structure may include a screen vent member on the supercharging air outlet side of the heat exchanger in order to even more effectively prevent backfire. The addition of such a member makes it possible to prevent backfire with an even higher degree of reliability, and also to prevent foreign matter from entering the air intake port side of the engine.

Air flow passages which allow the supercharging air to pass through the heat exchanger a plurality of times may be formed inside the case by providing the heat exchanger with a pair of tanks, a plurality of tubes communicating between the pair of tanks, and a plurality of fins bonded to the tubes and set along the tubes over specific intervals, and by allowing the supercharging air to sequentially pass through a plurality of blocks formed by dividing the area where the plurality of fins are provided into a plurality of blocks.

In this structure, the supercharging air passes through the heat exchanger multiple times inside the intercooler before it flows out, to promote the process of cooling the supercharging air. At the same time, since a backfire, too, passes through the heat exchanger multiple times, the backfire is bound to be quenched while passing through the heat exchanger.

In the structure described above in which the supercharging air and the backfire pass through the heat exchanger multiple times, it is desirable to provide partitioning plates at the frame body, which extend almost perpendicular to the surfaces of the heat exchanger on the supercharging air intake side and the supercharging air outlet side at positions corresponding to points between blocks and which reduce the gap between the heat exchanger and the inner wall of the case. The partitioning plates provided at the frame body prevent the supercharging air or the backfire from flowing out through a U-turn without passing through the heat exchanger multiple times first.

While the structure described above is achieved by mounting a frame body at the heat exchanger to incorporate a flame arrester function in the intercooler, the object of the present invention may be otherwise achieved in an intercooler having a case through which supercharging air passes and a heat exchanger that is mounted inside the case so as to allow the supercharging air to pass through and that allows for heat exchange between the supercharging air and a cooling fluid by constituting the heat exchanger with a pair of tanks, a plurality of tubes communicating between the pair of tanks, and a plurality of fins bonded to the tubes and set along the tubes over specific intervals, and by setting the distance between the fins of the heat exchanger and the inner wall of the case at the air passage portions on the intake side and the outlet side where the supercharging air is taken in and let out at the heat exchanger to a distance roughly equal to or smaller than the distance between the individual fins.

By adopting this structure, a function equivalent to that achieved by forcing a backfire to pass through the space between the fins is realized in the space between the heat exchanger and the inner wall of the case. As a result, it becomes possible to quench backfire which would otherwise enter through the gap between the heat exchanger and the case.

BRIEF DESCRIPTION OF THE DRAWINGS

The accompanying drawings show illustrative embodiments of the invention from which these and other objectives, novel features and advantages will be readily apparent.

DETAILED DESCRIPTION OF THE PREFERRED EMBODIMENTS

Figure 1:
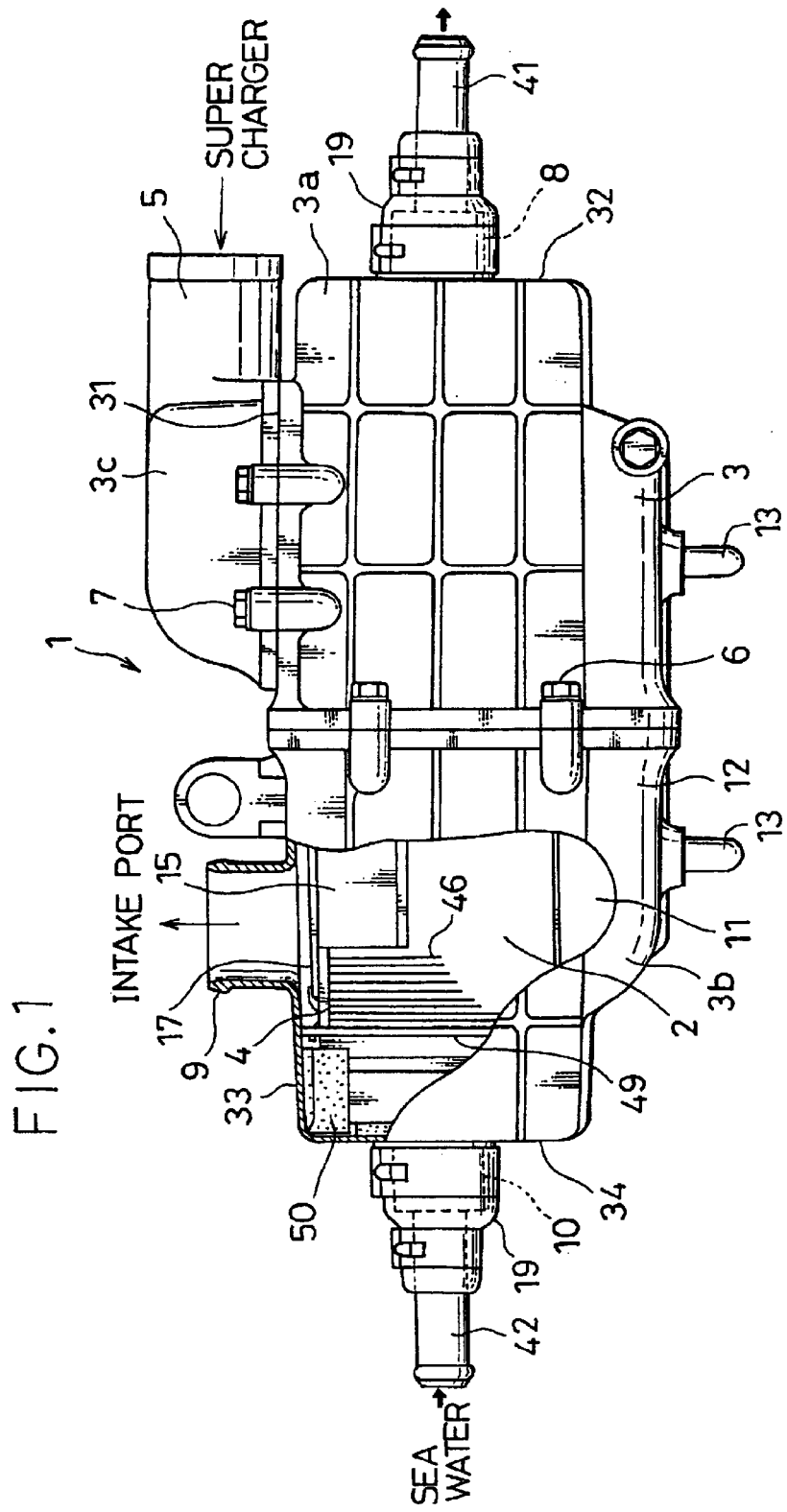
FIG. 1 presents a partial cut-away front view of an example of a structure that may be adopted in an intercooler.
Figure 2:
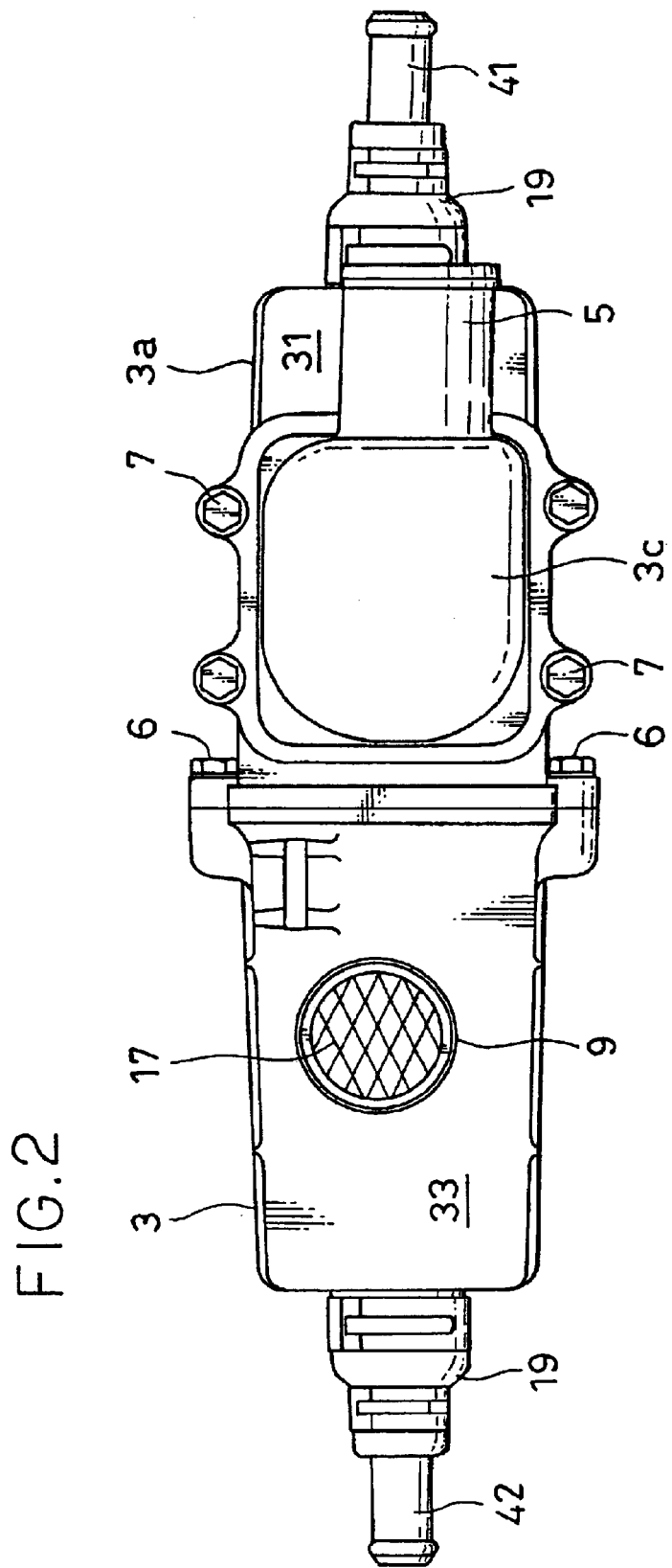
FIG. 2 is a plan view of the intercooler shown in FIG. 1.
Figure 3:
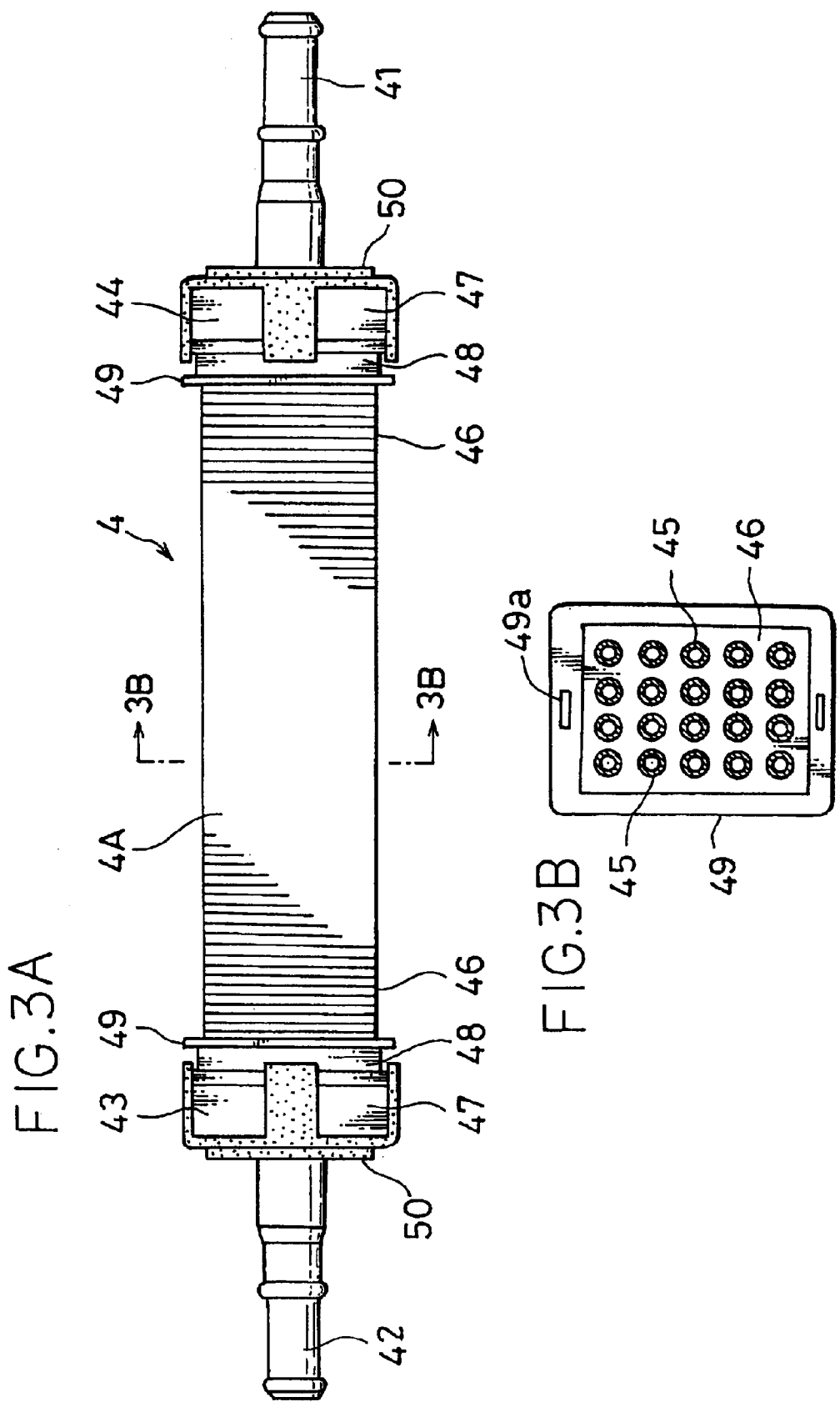
FIG. 3 illustrates the heat exchanger in the intercooler, with FIG. 3A presenting a plan view and FIG. 3B presenting a sectional view taken along line 3B—3B in FIG. 3A.

The following is an explanation of the embodiments of the present invention, given in reference to the drawings. An intercooler 1 shown in FIGS. 1 and 2, which is provided between a supercharger (not shown) that provides supercharging air to a 4-cycle engine mounted in a small planing boat such as a motorboat or a recreational watercraft and an engine intake port (not shown), is utilized to improve the engine output by lowering the temperature of the supercharging air supplied by the supercharger and thus raising the air density. The intercooler 1 includes at least a case 3 that defines a cooling space 2 through which the supercharging air passes and a heat exchanger 4 provided in the cooling space 2 inside the case 3. The intercooler 1 in this embodiment uses the fluid mass readily available at the location where the watercraft is driven, such as sea water, river water or lake water, as the cooling fluid for cooling the supercharging air passing through the case 3.

The case 3 has an intake-end case member 3a, an outlet-end case member 3b within which the heat exchanger 4 is housed, and an air intake case member 3c that forms an intake (air intake port) 5 through which the supercharging air is taken in. In this embodiment, the individual case members are formed through a die cast manufacturing method by using a material such as aluminum, aluminum alloy or the like. The intake-end case member 3a and the outlet-end case member 3b are secured to each other with bolts 6 by abutting their opening end surfaces to each other, and the air intake case member 3c is secured with bolts 7 to a side surface 31 of the intake-side case member 3a extending along the length of the case 3. In addition, an insertion portion 8 at which an outlet pipe 41 of the heat exchanger 4 is inserted projects out at a side surface 32 at an end of the intake-end case member 3a along the longitudinal axis of the case 3. At the outlet-end case member 3b, on the other hand, an outlet (air outlet port) 9 is formed as an integrated part of a side surface 33 extending along the longitudinal axis of the case 3, and an insertion portion 10 at which an intake pipe 42 of the heat exchanger 4 is inserted projects out at a side surface 34 at an end of the outlet-end case member 3b along the length of the case 3.

In this example, the intake 5 and the outlet 9 are formed at the same first side surface (the upper side surface in the figure. On a side of the case 3 (the lower side of the case in the figure) opposite from the side where the intake 5 and the outlet 9 are provided (i.e., a second side), a U-turn space forming distended portion 12 is formed to define a U-turn space 11 which constitutes part of the cooling space 2. It is to be noted that reference numeral 13 indicates a retaining rod formed at the U-turn space forming distended portion 12 in order to retain and secure the intercooler 1 at a specific position.

The heat exchanger 4 housed inside the case 3 includes a pair of tanks 43 (intake tank) and 44 (outlet tank), a plurality of tubes 45 provided between the pair of tanks and allowing communication between the pair of tanks 43 and 44, a plurality of plate-like fins 46 through which the plurality of tubes 45 extend, set perpendicular to the direction in which the tubes 45 extend and spaced apart over specific intervals along the direction in which the tubes 45 extend, an intake pipe 42 extending to the outside of the heat exchanger 4 along a direction matching the direction in which the tubes 45 extend from one of the tanks, i.e., the tank 43, and an outlet pipe 41 extending to the outside of the heat exchanger 4 along a direction matching the direction in which the tubes 45 extend from the other tank 44. The liquid mass readily available at the location where the watercraft is operated, such as sea water, river water or lake water, is allowed to flow in through the intake pipe 42 and is allowed to flow through the individual tubes 45 via the tank 43 before it is discharged via the outlet pipe 41 from the tank 44. It is desirable that the fins 46 be made of an aluminum alloy with at least either a corrosion resistant resin film or a hydrophilic resin film formed at the surfaces thereof through a surface treatment.

The tank 43 (44) is constituted of a tank main body 47 formed together with the intake pipe 42 (the outlet pipe 41) as an integrated unit by using a synthetic resin or the like, and a tube mounting plate 48 that blocks the opening side of the tank main body 47, with the plurality of tubes 45 fitted at the tube mounting plate 48. It is desirable to form the tubes 45 from a cupro-nickel material (a copper-nickel alloy) or the like having a high degree of corrosion resistance against sea water. In addition, a baffle plate 49 constituted of an EPDM (ethylene-propylene-dien-monomer) rubber or the like is provided between the tube mounting plate 48 and the fins 46 in order to protect the tank 43 (44) constituted of the synthetic resin from aging.

In addition, a buffer member 50 is provided at the circumferential side surface and the end surface of the tank 43 (44) so as to prevent the vibrations of the case 3 from affecting the heat exchanger 4 by avoiding direct contact between the heat exchanger 4 and the case 3 when the heat exchanger 4 is mounted in the case 3, and also to absorb the thermal expansion and contraction of the heat exchanger 4 along the lengthwise direction.

Furthermore, at a heat exchanging unit 4A constituted of the tubes 45 and the fins 46 in the heat exchanger 4, a frame body 15 that partitions the cooling space 2 excluding the U-turn space 11 into an intake side and an outlet side and reduces the gap between the heat exchanger 4 and the case 3, is mounted.

Figure 4:
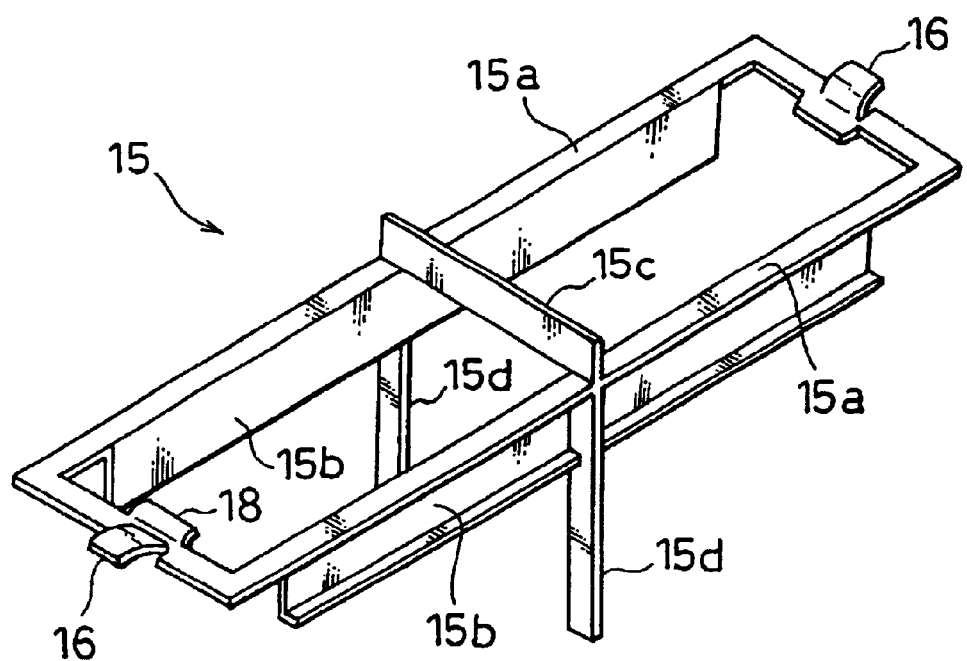
FIG. 4 presents a perspective of the frame body for mounting a heat exchanger of the intercooler.
Figure 5A:
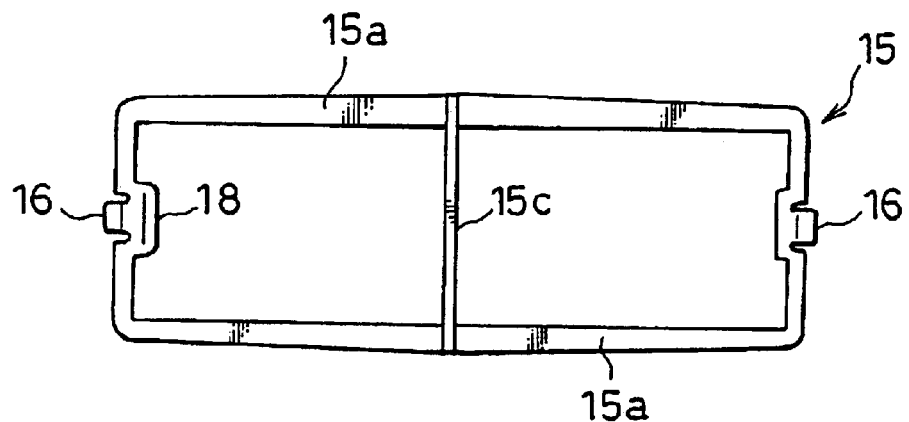
FIG. 5 illustrates the frame body for mounting the heat exchanger of the intercooler, with FIG. 5A presenting a plan view, FIG. 5B presenting a front elevation view and FIG. 5C presenting a side elevation view.
Figure 5B:
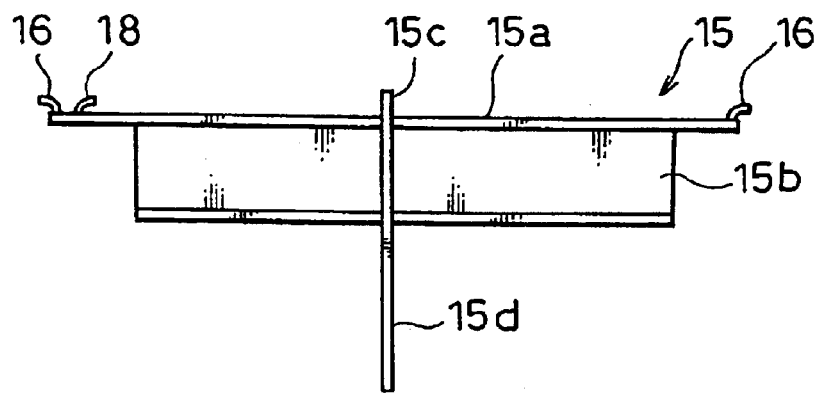
Figure 5C:
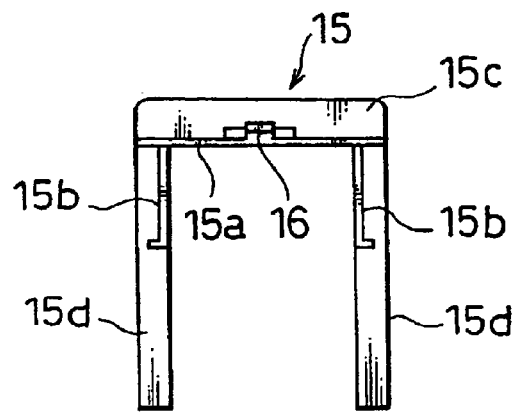
Figure 6:
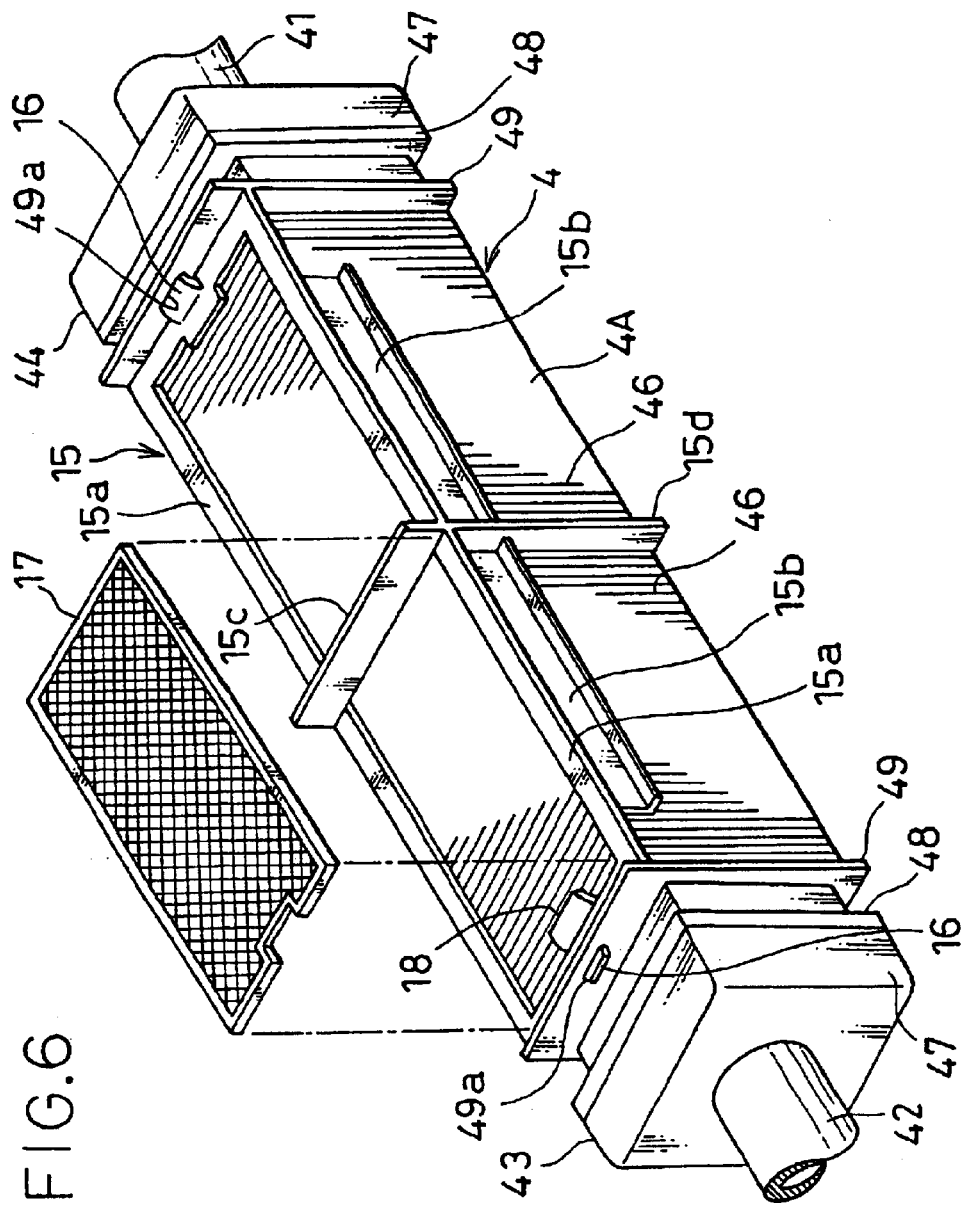
FIG. 6 presents a perspective of the intercooler with the frame body mounted at the heat exchanger and the air passage member also mounted therein.

The frame body 15 mounted to the heat exchanger 4, as shown in FIGS. 4 through 6, at a surface (the upper surface of the heat exchanging unit 4A in the figures) of the heat exchanger 4 facing the side surface of the case where the intake 5 and the outlet 9 are provided, has an edge plate 15a provided over the circumferential edges (the circumferential edge of the heat exchanging unit 4A) at the air passage portions on the supercharging air intake side and the supercharging air outlet side of the heat exchanger 4 to reduce the gap formed between the heat exchanging unit 4A and the inner wall of the case 3 over these areas. The frame body also has suspended plates 15b which are set along the side edges of the edge plate 15a extending along the lengthwise direction and are fitted at the two side surfaces of the heat exchanging unit 4A continuous from the upper surface of the heat exchanging unit 4A, a bridging plate 15c bridging the two sides of the edge plate 15a at a position halfway between the two ends of the edge plate 15a, and partitioning plates 15d formed continuous to the bridging plate 15c. The bridging plate 15c is formed so as to reduce the gap between the heat exchanger 4 and the inner wall of the case 3 in the space between the intake air passage portion and the outlet air passage portion through which the supercharging air is passed in the heat exchanger 4. In addition, the partitioning plates 15b, which extend downward from the edge plate 15a along the two side surfaces of the heat exchanging unit 4A and are continuous from the upper surface of the heat exchanging unit 4A so as to extend roughly perpendicular to the surfaces of the heat exchanger 4 on the supercharging air intake side and the supercharging air outlet side, reduce the gap between the heat exchanging unit 4A and the inner wall of the case 3 formed over these areas.

The edge plate 15a includes retaining pieces 16 to be inserted into retaining holes 49a formed in the baffle plate 49, and retaining pieces 18 for holding a screen vent member 17 made of metal or resin. The screen vent member 17 is formed as a screen with a specific degree of porosity, and is provided at a position facing the outlet 9 on the side toward the outlet-side case member 3b.

The frame body 15 and the air passage member 17 described above are mounted to the heat exchanger 4 by placing the frame body 15 above the heat exchanging unit 4A with the suspended plates 15b and the partitioning plates 15d turned downward, directly lowering the frame body 15 so as to set the suspended plates 15b against the two sides of the heat exchanging unit 4A, inserting (to retain) the retaining pieces 16 in the retaining holes 49a at the baffle plate 49, and also retaining the air passage member 17 with the retaining pieces 18 from above the frame body 15.

The heat exchanger 4 mounted with the frame body 15 may be installed in the case 3 by assembling the intake-side case member 3a and the outlet-side case member 3b from the two sides of the heat exchanger 4, allowing the intake pipe 42 and the outlet pipe 41 to extend outside through the corresponding pipe insertion portions 10 and 8. The pipe insertion portions 8 and 10 are externally fitted with cylindrical seal members 19 so as to seal the spaces between the intake pipe 42 of the heat exchanger 4 and the pipe insertion portion 10 and between the outlet pipe 41 of the heat exchanger 4 and the pipe insertion portion 8, and then the intake-side case member 3a and the outlet-side case member 3b are secured to each other with the bolts 6.

Figure 7:
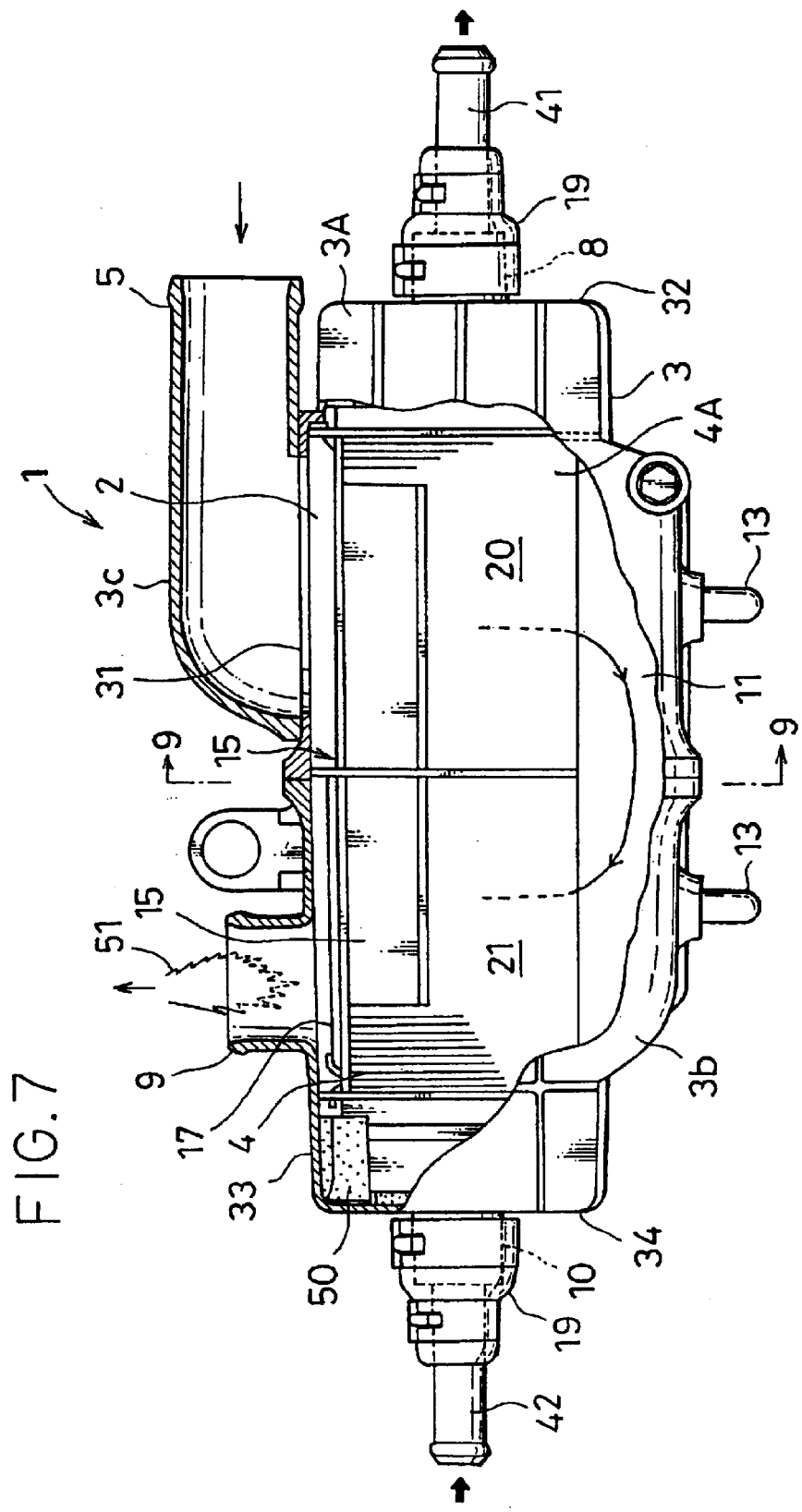
FIG. 7 presents a partial cut-away sectional view of the intercooler viewed from the front with the heat exchanger mounted with the frame body installed inside the case.
Figure 8:
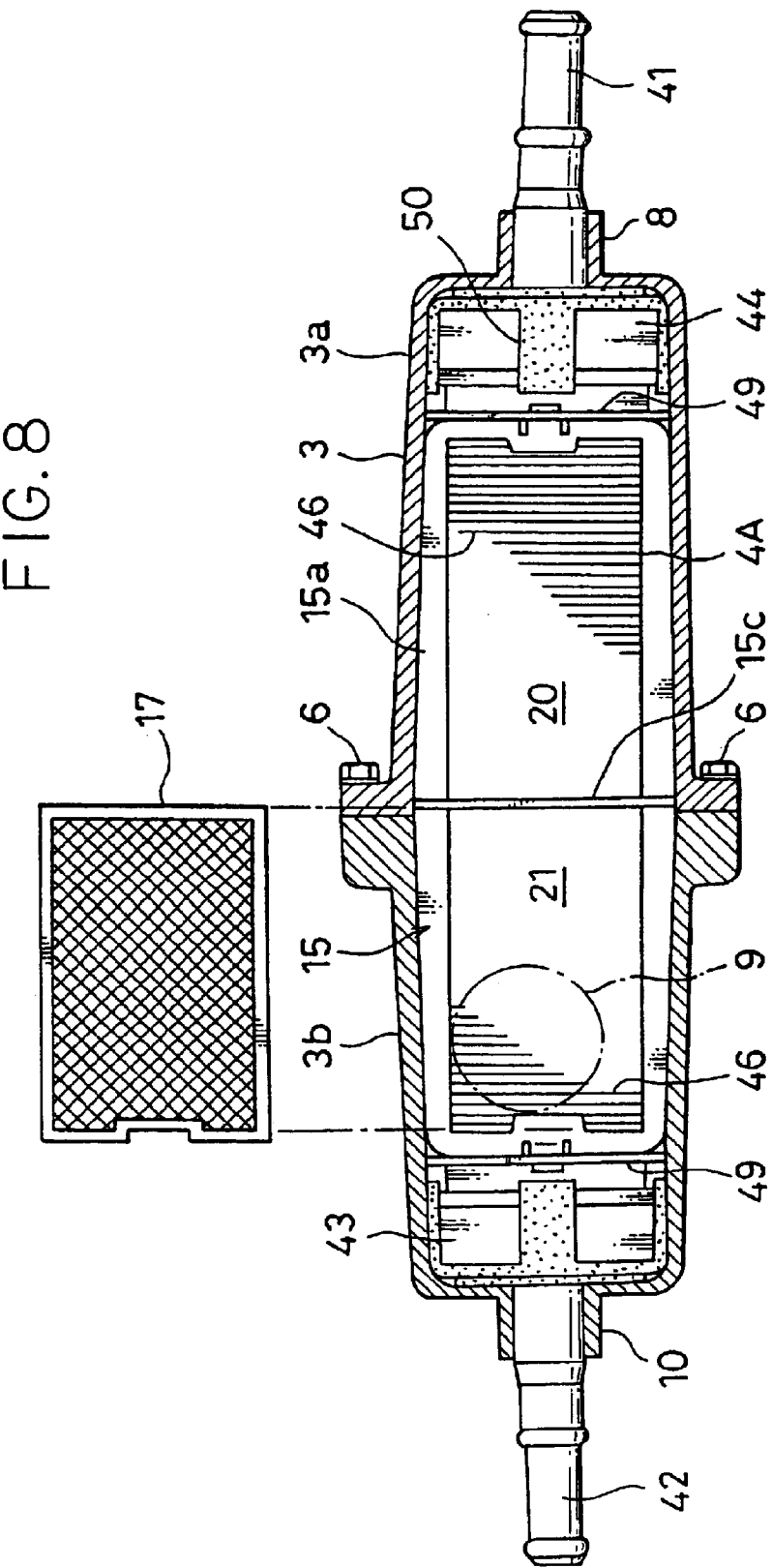
FIG. 8 presents a planar sectional view of the intercooler with the heat exchanger mounted with the frame body installed inside the case and the air passage member disengaged.
Figure 9:
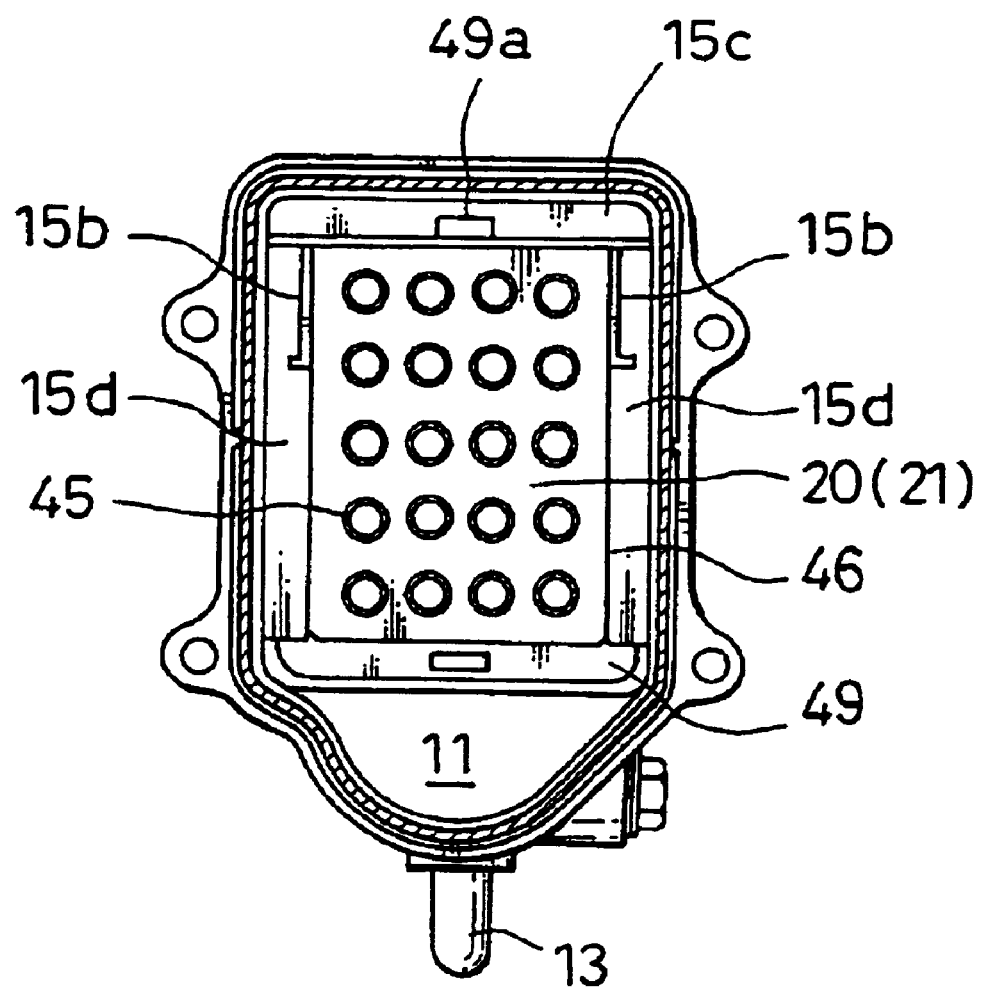
FIG. 9 presents a sectional view through line 9—9 in FIG. 7.

Thus, by housing the heat exchanger 4 inside the case 3 with such a frame body 15 mounted to the heat exchanging unit 4A thereof, the upper part of the cooling space 2 is divided into an intake side and an outlet side by the bridging plate 15c of the frame body 15, as illustrated in FIGS. 7 through 9, which partitions the portion of the heat exchanging unit 4A where the fins 46 are provided into an intake side block and an outlet side block thereby forming air flow passages which allow the supercharging air to pass through the heat exchanger 4 twice within the case 3 extending from the intake 5 to the outlet 9 with a first heat-exchanging flow passage 20 through which the supercharging air passes through the heat exchanger 4 at the intake side block of the heat exchanging unit 4A and a second heat-exchanging flow passage 21 through which the supercharging air passes the heat exchanger 4 at the outlet side block. As a result, the supercharging air flowing in through the intake 5 reaches the U-turn space 11 after passing through the first heat-exchanging flow passage 20. After traveling through the U-turn space 11, it passes through the second heat-exchanging flow passage 21 and reaches the intake port of the engine from the outlet 9, as indicated by the arrows in FIG. 7.

Thus, the high-temperature supercharging air force-fed from the supercharger undergoes heat exchange with cool sea water while passing through the spaces between the fins of the heat exchanger 4 in the intercooler 1 and thus it becomes cooled, resulting in an increase in the air density.

In addition, the edge plate 15a of the frame body 15 mounted at the heat exchanging unit 4A of the heat exchanger 4 guides the supercharging air to the heat exchanging unit 4A with a high degree of reliability. Furthermore, even if a backfire 51 should blow out from the side where the outlet 9 is provided, the backfire 51 can be guided to the heat exchanging unit 4A with a high degree of reliability. As a result, the backfire 51 is dispersed over the numerous fins 44 provided at the heat exchanging unit 4A over the specific intervals and, at the same time, it is cooled and quenched at the fins 46. In particular, since the screen vent member 17 is provided at the heat exchanging unit 4A at a position facing the outlet 9 at the supercharging air outlet side of the heat exchanger 4 in this example, the backfire 51 can be suppressed even more effectively and, moreover, entry of foreign matter into the engine air intake port can be prevented.

Furthermore, since the partitioning plates 15d are provided almost perpendicular to the edge plate 15a of the frame body 15 to reduce the gap between the heat exchanger 4 and the inner wall of the case 3 at positions corresponding to the points between the intake side block constituting the first heat-exchanging flow passage 20 and the outlet side block constituting the second heat-exchanging flow passage 21 in the embodiment, the supercharging air and backfire are prevented from bypassing through a side of the heat exchanging unit 4A without passing through the heat exchanging flow passages to the U-turn space 11. Thus, the supercharging air and the backfire are made to pass through the heat exchanging unit 4A with a large caloric capacity a plurality of times with a high degree of reliability. As a result, reliable cooling of the supercharging air is assured and, at the same time, the concern that a backfire may erupt from the intake 5 is eliminated.

Figure 10:
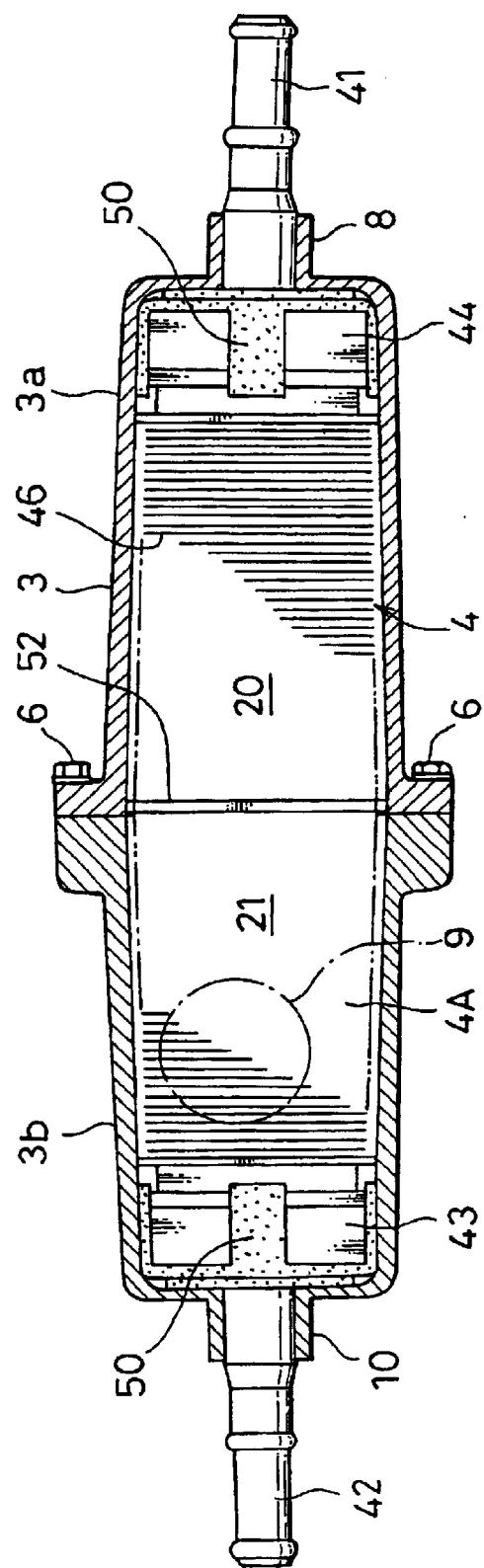
FIG. 10 presents a planar sectional view of an example of a structure that may be adopted in an intercooler achieving a flame arrester function without utilizing any frame body.

While the gap between the heat exchanger 4 and the case 3 is reduced by the frame body 15 in the structure described above, the frame body 15 may be omitted by setting the distance between the heat exchanger 4 and the inner wall of the case 3 approximately equal to or less than the pitch of the fins 46. For instance, the gap between the heat exchanging unit 4A and the inner wall of the case 3 over the air passage portions of the heat exchanger 4 on the supercharging air intake side and the supercharging air outlet side may be reduced by setting the width of the fins 46 constituting the heat exchanging unit 4A roughly equal to the distance between the opposite sides of the inner wall of the case 3, as shown in FIG. 10. It is to be noted that reference numeral 52 indicates a barrier provided at the case or at the top of the heat exchanging unit 4A to divide the heat exchanging unit 4A into the intake side block constituting the first heat-exchanging flow passage 20 and the outlet side block constituting the second heat-exchanging flow passage 21. Since other structural features are identical to those adopted in the previous structural example, a repeated explanation thereof is omitted by assigning the same reference numerals to identical portions.

By adopting this structure, a backfire which would otherwise pass through the space between the heat exchanger 4 and the case 3 can be suppressed in a manner similar to that with which a backfire passing between the fins 46 is quenched. Thus, the intercooler 1 achieves a flame arrester function without having to provide a frame body.

It is to be noted that while the screen vent member 17 is provided on the supercharging air outlet side of the heat exchanger 4 in the structure described above, it has been confirmed that a backfire can be fully prevented from blowing out even without the screen vent member 17. In addition, while the portion of the heat exchanging unit over which the fins are provided is divided into two blocks to achieve a 2-pass structure in which the supercharging air is allowed to pass through the heat exchanger 4 twice in the structure described above, similar advantages may be achieved when the portion of the heat exchanging unit is divided into three or more blocks by providing a similar frame body at the circumferential edges of the air passage portions on the supercharging air intakes side and the supercharging air outlet side at the heat exchanger or by setting the gap between the heat exchanging unit 4A and the inner wall of the case 3 roughly equal to or smaller than the pitch of the fins 46.

As explained above, since a frame body for reducing the gap between the inner wall of the case and the heat exchanger is mounted at the circumferential edges of the air passage portions on the supercharging air intake side and the supercharging air outlet side of the heat exchanger installed inside the case of the intercooler to force any backfire to pass through the heat exchanger with a high degree of reliability according to the present invention, the backfire is not allowed to pass through and blow out through a gap between the heat exchanger and the case. As a result, any backfire can be reliably suppressed at the intercooler without having to provide a separate arrester device. In addition, since it is not necessary to provide a separate arrester device, a reduction in the required installation space is achieved and, at the same time, a reduction in the weight of the air intake system is achieved.

By providing a screen vent member on the supercharging air outlet side of the heat exchanger assuming the structure described above, a backfire can be even more effectively suppressed and, furthermore, entry of foreign matter into the engine intake port can be prevented.

Furthermore, with air flow passages which allow the supercharging air to pass through the heat exchanger a plurality of times formed inside the case by providing the heat exchanger with a pair of tanks, a plurality of tubes communicating between the pair of tanks, and a plurality of fins bonded to the tubes and spaced apart along the tubes at specific intervals, and by dividing the portion of the heat exchanger over which the plurality of fins are provided into a plurality of blocks to cause the supercharging air to sequentially pass through the individual blocks, the total passage length through which the supercharging air or backfire passes through the heat exchanger is increased to ensure that any backfire is reliably quenched.

In the structure described above having air flow passages formed to allow the supercharging air/backfire to pass through the heat exchanger a plurality of times, a U-turn flow of the backfire whereby the backfire travels through the heat exchanger without passing through the heat exchanger a plurality of times can be prevented by providing partitioning plates at the frame body, which extend almost perpendicular to the surfaces of the heat exchanger on the supercharging air intake side and the supercharging air outlet side at positions corresponding to points between the blocks to reduce the gap between the heat exchanger and the inner wall of the case. Because the backfire is forced to pass through the spaces between the fins with a large caloric capacity a plurality of times, the concern of the backfire blowing out into the upstream side of the intercooler is eliminated.

Moreover, by providing the heat exchanger of the intercooler with a pair of tanks, a plurality of tubes communicating between the pair of tanks, and a plurality of fins bonded to the tubes and spaced apart along the tubes at specific intervals, and also by setting the distance between the fins of the heat exchanger and the inner wall of the case over the air passage portions of the heat exchanger at the supercharging air intake side and the supercharging air outlet side roughly equal to or smaller than the pitch of the fins, a flame arrester function is achieved in the intercooler without having to provide a frame body. As a result, blow out of a backfire into the upstream side of the intercooler via the space between the heat exchanger and the case can be prevented.

What is claimed is:

1. An intercooler comprising:
   a case having an air intake port, an air outlet port, and an interior air cooling space shaped to allow supercharging air to pass through said case from said air intake port to said air outlet port, said air intake port and said air outlet port both being located in a first side of said case opposite a second side of said case;
   a heat exchanger including a heat exchange unit mounted within said interior air cooling space between said first side and said second side of said case, for allowing heat exchange between a cooling fluid flowing through said heat exchanger and the supercharging air passing through said case; and
   a frame body mounted to said heat exchange unit of said heat exchanger, said frame body being shaped and arranged to direct a flow of the supercharging air within said interior air cooling space from said air intake port to said second side of said case opposite said first side before the supercharging air exits said interior air cooling space via said air outlet port, said frame body including:
   an edge plate over a circumference of a first surface of said heat exchange unit, said first surface of said heat exchange unit facing said first side of said case;
   a pair of suspended plates attached to respective longitudinal sides of said edge plate, each of said suspended plates being extending in a longitudinal direction of said heat exchange unit;
   a bridging plate extending from a middle portion of said edge plate toward said first side of said case; and
   a pair of partitioning plates attached to respective longitudinal sides of said edge plate so as to extend toward said second side of said case.

2. The intercooler of claim 1, wherein said second side of said case has a distended portion forming a U-turn portion of said interior air cooling space of said case, said bridging plate and said partitioning plates being arranged at said middle portion of said edge plate so as to divide said interior air cooling space into a first cooling space portion having a first end of said heat exchange unit arranged therein and a second cooling space portion having a second end of said heat exchange unit arranged therein, said air intake port being located at said first cooling space portion and said air outlet port being located at said second cooling space portion, and wherein said air intake port, said air outlet port, said first cooling space portion, said U-turn portion, and said second cooling space portion are arranged to form an air passage channeling the supercharging air from said air intake port into said first cooling space portion, from said first cooling space portion into said U-turn portion, from said U-turn portion into said second cooling space portion, and from said second cooling space portion into said air outlet port.

3. The intercooler of claim 2, further comprising a screen vent member in said second cooling space portion of said interior air cooling space and located between said frame body and said air outlet port.

4. The intercooler of claim 1, further comprising a screen vent member in said interior air cooling space and located between said frame body and said air outlet port.

5. The intercooler of claim 1, wherein said heat exchange unit comprises a plurality of tubes and a plurality of fins attached to each of tubes, each of said fins extending in an orthogonal direction with respect to a longitudinal direction of said tubes, said fins being spaced apart at an interval along the longitudinal direction of said tubes.

6. The intercooler of claim 1, further comprising a buffer member between an intake tank and said case and between an outlet tank and said case.

7. The intercooler of claim 1, further comprising a buffer member between said heat exchanger and said case.

8. The intercooler of claim 1, wherein at least a portion of said frame body is located in a gap between said heat exchange unit of said heat exchanger and an inner surface of said case so as to at least partially fill said gap.

9. The intercooler of claim 1, wherein said bridging plate is arranged in a gap between an inner surface of said first side of said case and a first surface of said heat exchange unit of said heat exchanger facing said inner surface of said first side of said case.

10. An intercooler comprising:
a case having an air intake port, an air outlet port, and an interior air cooling space shaped to allow supercharging air to pass through said case from said air intake port to said air outlet port, said air intake port and said air outlet port both being located in a first side of said case opposite a second side of said case;
a heat exchanger including a heat exchange unit mounted within said interior air cooling space between said first side and said second side of said case, for allowing heat exchange between a cooling fluid flowing through said heat exchanger and the supercharging air passing through said case;
a frame body mounted to said heat exchange unit of said heat exchanger, said frame body being shaped and arranged to direct a flow of the supercharging air within said interior air cooling space from said air intake port to said second side of said case opposite said first side before the supercharging air exits said interior air cooling space via said air outlet port; and
a screen vent member in said interior air cooling space and located between said frame body and said air outlet port.

11. An intercooler comprising:
a case having an air intake port, an air outlet port, and an interior air cooling space shaped to allow supercharging air to pass through said case from said air intake port to said air outlet port, said air intake port and said air outlet port both being located in a first side of said case opposite a second side of said case, said case including an intake-end member and an outlet-end member separably attached by fasteners to said intake-end member, said air intake port being located in said intake-end member, and said air outlet port being located in said outlet-end member;
a heat exchanger including a heat exchange unit mounted within said interior air cooling space between said first side and said second side of said case, for allowing heat exchange between a cooling fluid flowing through said heat exchanger and the supercharging air passing through said case; and
a frame body mounted to said heat exchange unit of said heat exchanger, said frame body being shaped and arranged to direct a flow of the supercharging air within said interior air cooling space from said air intake port to said second side of said case opposite said first side before the supercharging air exits said interior air cooling space via said air outlet port.

12. An intercooler comprising:
a case having an air intake port, an air outlet port, and an interior air cooling space shaped to allow supercharging air to pass through said case from said air intake port to said air outlet port, said air intake port and said air outlet port both being located in a first side of said case opposite a second side of said case;
a heat exchanger including:
a heat exchange unit mounted within said interior air cooling space between said first side and said second side of said case, for allowing heat exchange between a cooling fluid flowing through said heat exchanger and the supercharging air passing through said case, said heat exchange unit including a plurality of tubes and a plurality of fins attached to each of tubes, each of said fins extending in an orthogonal direction with respect to a longitudinal direction of said tubes, said fins being spaced apart at an interval along the longitudinal direction of said tubes; and
an intake pipe communicating with an intake tank, and an outlet pipe communicating with an outlet tank, said heat exchange unit being arranged between and in communication with said intake tank and said outlet tank so that said intake pipe communicates with said outlet pipe via said plurality of tubes; and
a frame body mounted to said heat exchange unit of said heat exchanger, said frame body being shaped and arranged to direct a flow of the supercharging air within said interior air cooling space from said air intake port to said second side of said case opposite said first side before the supercharging air exits said interior air cooling space via said air outlet port.

* * * * *